(12) United States Patent
Bottomley

(10) Patent No.: US 7,342,324 B2
(45) Date of Patent: Mar. 11, 2008

(54) ELECTRONIC SECURITY SYSTEM

(75) Inventor: Chris Bottomley, W. Midlands (GB)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 10/478,661

(22) PCT Filed: Jun. 28, 2002

(86) PCT No.: PCT/GB02/02985

§ 371 (c)(1),
(2), (4) Date: Jun. 9, 2004

(87) PCT Pub. No.: WO03/002385

PCT Pub. Date: Jan. 9, 2003

(65) Prior Publication Data

US 2004/0222699 A1 Nov. 11, 2004

(30) Foreign Application Priority Data

Jun. 28, 2001 (GB) .................................. 0115730.4

(51) Int. Cl.
B60R 25/04 (2006.01)
B60R 25/10 (2006.01)
E05B 45/06 (2006.01)
(52) U.S. Cl. ................. 307/10.3; 340/5.21; 340/426.12
(58) Field of Classification Search ............... 307/10.3; 340/426.19, 5.21, 426.12
See application file for complete search history.

(56) References Cited

U.S. PATENT DOCUMENTS

| 5,381,128 | A | * | 1/1995 | Kaplan | ................. 340/426.17 |
| 5,513,244 | A | | 4/1996 | Joao et al. | |
| 5,635,901 | A | * | 6/1997 | Weinblatt | ............... 340/426.12 |
| 6,018,291 | A | * | 1/2000 | Marble et al. | .......... 340/426.12 |
| 6,052,468 | A | * | 4/2000 | Hillhouse | .................... 380/281 |
| 6,225,890 | B1 | * | 5/2001 | Murphy | ................. 340/426.19 |
| 6,891,467 | B2 | * | 5/2005 | Perttunen et al. | ....... 340/426.17 |
| 6,978,021 | B1 | * | 12/2005 | Chojnacki | .................... 380/202 |
| 7,031,826 | B2 | * | 4/2006 | Flick | .......................... 701/113 |

FOREIGN PATENT DOCUMENTS

| DE | 19601816 | 7/1997 |
| EP | 0637528 A | 2/1995 |
| EP | 1002705 | 4/2004 |
| GB | 2305216 | 4/1997 |

* cited by examiner

Primary Examiner—Robert L. Deberadinis
Assistant Examiner—Andrew Deschere
(74) Attorney, Agent, or Firm—Frank A. MacKenzie; Brooks Kushman P.C.

(57) ABSTRACT

An electronic security apparatus for a vehicle being capable of controlling the performance of a vehicle function in response to a user attempting to start the engine of the vehicle. The system being capable of controlling the performance of the vehicle function in response to being provided with a first security code from an electronic key (12). The security system has a secured mode of operation in which the system may be set to a limited authorization state in which performance of the vehicle function is enabled. The system also has an unsecured mode of operation in which the user performing the action enables performance of the vehicle function irrespective of whether or not one or more conditions are met.

10 Claims, 5 Drawing Sheets

| 48 | 50 | 52 | 54 | 56 |
|---|---|---|---|---|
| VEHICLE ID | TIME PERIOD | GEOGRAPHIC AREA | USER ID | SECOND SECURITY CODE CRYPTOGRAPHIC KEY |
| 355454668 | 17.6.2001-18.6.2001 | y=43.67,y=47.35,r=35 | 2665474643 | 34tegt65376trgr |
| 656535456 | 17.6.2001-18.6.2001 | y=43.67,y=47.35,r=35 | 2665474643 | 453grh65y45t4f |
| 646778775 | 17.6.2001-18.6.2001 | y=43.67,y=47.35,r=35 | 2665474643 | 3tyh4tgtwg43t5r |

FIG. 4

ELECTRONIC SECURITY SYSTEM

FIELD OF THE PRESENT INVENTION

This application claims priority to, and is a National Phase filing of, PCT Application Ser. No. PCT/GBO2/02985, filed Jun. 28, 2002.

The present invention relates to electronic security systems for vehicles operated using electronic keys.

BACKGROUND

Electronic engine immobilizer systems for vehicles are known. An electronic engine control module, or security module which operates with the electronic engine control module, is generally in an armed state whenever the engine is switched off. This prevents the engine from being started (for example, by disabling the spark distribution system and/or the fuel injection system). The immobilizer system may be disarmed by use of the correct electronic vehicle key. Typically, a radio frequency (RF) transceiver is located in the head of a conventional mechanical key for the standard mechanical lock on the steering column of the vehicle. The transponder has a unique digital security code. The code is sent to an RF transceiver in the vehicle and the security code is passed to the security module or electronic engine control module of the vehicle. If the security code matches a security code stored in the security module or electronic engine control module, the engine immobilizer function is disarmed. Once the engine is switched off again, the security module or electronic engine control module is returned to an armed state.

Electronic vehicle access systems are known. Typically, an electronic vehicle access control module or security module is connected to the central locking system of the vehicle, for securing all vehicle access points, and to a RF receiver located in the vehicle such that RF signals may be received from inside and outside the vehicle. An RF transmitter is located in the head of a conventional mechanical key, or in a separate electronic key device, and is operable, by activation of a push button, to transmit a unique digital security code which may be received by the RF receiver of the vehicle and passed to the electronic vehicle access control module or security module. If the security code matches a security code stored in the electronic vehicle access control module or security module, the central locking system of the vehicle is controlled to toggle between a locked and an unlocked state. The RF transmitter is typically sufficiently powerful to transmit a receivable signal over a distance of a few metres. Thus, access points to a vehicle may be locked or unlocked remotely.

U.S. Pat. No. 6,181,026 describes a vehicle immobilizer system for electronic engine control in which the controller for the engine immobilizer, when in a disarmed state, monitors engine-running sensors and switches to the armed state if the engine-running sensors indicate that the engine is not running even though the ignition switch has not been detected have been put in the off position.

International patent publication WO 01/25572 describes a vehicle access system with an electronic key which provides an authorisation signal without requiring manual activation by the user. The system includes two modes, one of which is a conventional mode and the other of which is referred to as a valet mode. Vehicle functions, such as unlocking of the car boot, are prevented in valet mode of operation. The valet mode does not prevent vehicle theft by a person having use of the electronic key, since a valet is required to be able to drive the vehicle on behalf of the owner.

GB-A-2305216 discloses a security controller for a vehicle which receives "lock" and "unlock" signals from a portable transmitter unit. If the vehicle is stolen and correct authorisation given, a remote station will transmit a "disable" signal which will cause the controller to disable the vehicle. The security controller can allow the remote station to track the vehicle. The remote station can transmit signals which override signals from the portable transmitter.

During the distribution of recently manufactured vehicles, it is common to place the vehicles in a secure mass storage area. To allow quick operation of the vehicles in the storage area, the vehicles may be left with the vehicle keys inside and the doors of the vehicles unlocked. However, control of access to the secure area is difficult to administer and vehicle theft can be a problem unless expensive security measures are implemented. Similar problems arise in other situations in which the vehicle keys are kept in the vicinity of the vehicle.

The present invention aims to provide a solution to such problems.

SUMMARY OF THE PRESENT INVENTION

According to a first aspect of the present invention there is provided electronic security apparatus in accordance with appended claim 1.

Thus, the electronic security system may be placed in the secured mode during storage or transit or at other times when the keys and vehicle may be co-located, to nevertheless prevent theft (for example, by disabling one or more vehicle functions such as the switching off of the immobilizer), and later set to an unsecured mode when the vehicle has been delivered. The dealer or owner can then implement security by keeping the vehicle key in a secure location.

The setting of the limited authorisation state is temporary. For instance, the unauthorized state may be automatically set after n user actions have been performed resulting in the performance of the vehicle function, where n is an integer. Thus, although limited authorisation may be provided so as to allow for example the vehicle to be moved, the electronic security system reverts to the unauthorized state after sufficient opportunity has been provided for the vehicle function to be performed.

Preferably, the mode of operation is configurable by a user in dependence on one or more predetermined criteria being met, the criteria including one or more of the following: the vehicle being a predetermined vehicle, the time of user configuration being within a predetermined period of time, the geographic location of an electronic device being within a predetermined geographic region, and the user being a predetermined user. Thus, when a vehicle function needs to be performed whilst the vehicle is in the secured state, such as when a vehicle needs to be driven, performance of the vehicle function may be allowed by configuring the first mode, but only under controlled and predetermined criteria.

Preferably, the process of determining whether the predetermined criteria are met is performed by accessing remotely stored data other than data representing the predetermined criteria, the remotely stored data including: a vehicle identifier, a current time, a current geographical location of an electronic device, a user identifier. In preferred embodiments, the current time and/or current geographical location are obtained using a GPS and/or RDS system, and the user identifier is obtained from a user smart card. Thus, the data required to verify that the mode of operation may be configured, and vehicle functions performed, may be stored and retrieved from secure and reliable external systems.

In one embodiment, the unsecured mode of operation is permanently configured after the system has been set to the limited authorisation state a predetermined number of times and/or the vehicle has been driven a predetermined distance or after a predetermined time or period of time. Although vehicle security is required during storage and transit following manufacture, after this has occurred, vehicles may be under dealer or end consumer control, and other conventional security systems may once again be employed, thus, advantageously, the electronic security system may be automatically set to the unsecured mode.

According to a second aspect of the present invention there is provided a method of controlling the performance of a vehicle function in response to a user action, in accordance with appended claim 9.

Computer programs for performing the method are also provided.

Further features and advantages of the present invention are to be found in the following description of preferred embodiments of the invention, given by way of example only, made with reference to the accompanying drawings.

BRIEF DESCRIPTION OF DRAWINGS

FIG. 4 is a schematic diagram showing data representing predetermined criteria and second security codes according to an embodiment of the present invention;

DETAILED DESCRIPTION OF EMBODIMENTS OF THE PRESENT INVENTION

Figure 1:
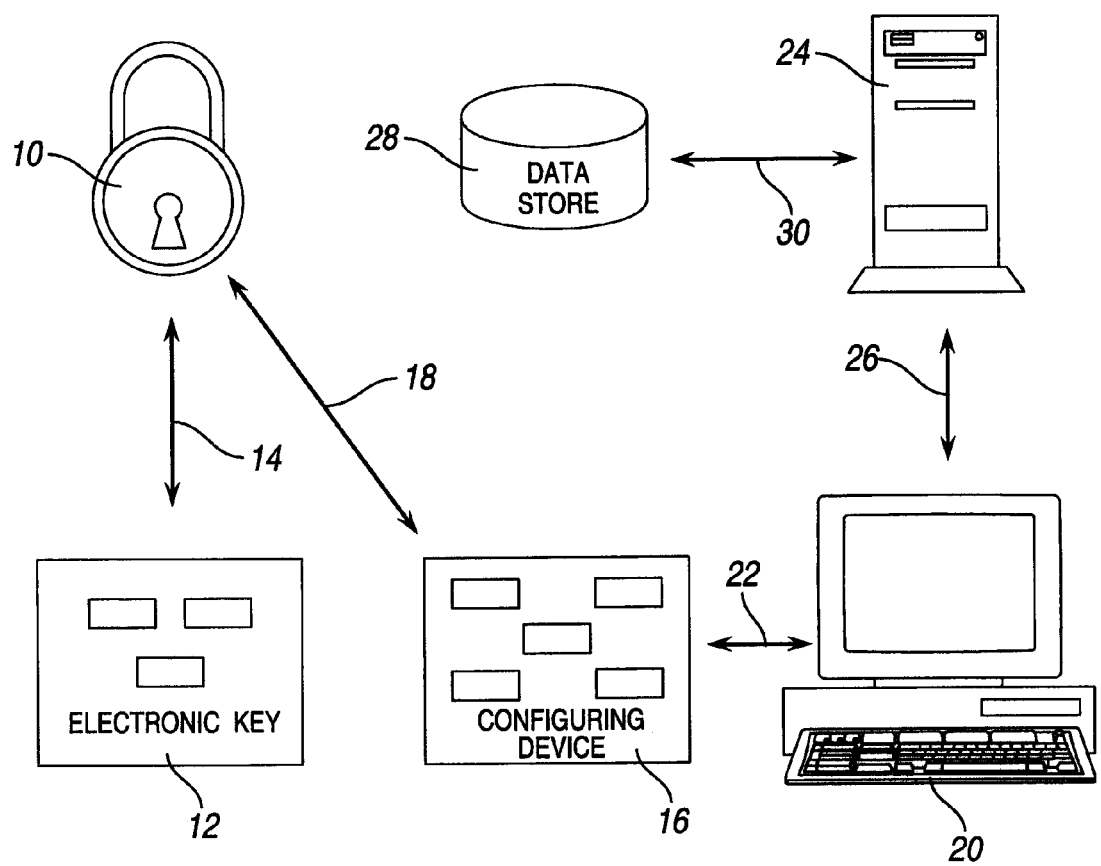
FIG. 1 is a schematic diagram showing a systems architecture for use in an embodiment of the present invention.

FIG. 1 is a schematic diagram showing a systems architecture for use in an embodiment of the present invention. An electronic security system 10 fitted to a vehicle such as an automobile (not shown) is capable of controlling the performance of a vehicle function. It is to be understood that the vehicle function controlled may be any vehicle function such as the operation of the engine or the central locking system. However, for illustrative purposes we shall assume that the vehicle function controlled is the operation of the engine. In this embodiment the security system 10 includes an engine immobilizer. Electronic security system 10 is capable of communicating data with electronic key 12 over a communications channel 14. The key 12 may take the form of a conventional mechanical key for the standard mechanical lock on the steering column of the vehicle, including an RF transponder as in the prior art. However that the term "electronic key" as used herein includes devices such as mechanical keys, smart cards, and other devices capable of providing security codes to an electronic security system.

In this embodiment of the invention, different types of security codes are generated using different cryptographic keys stored on the device generating the security code, and authenticated using corresponding cryptographic keys stored on the device authenticating the security code. Herein, a first security code corresponds with a first cryptographic key set, a second security code corresponds with a second cryptographic key set and a third security code corresponds with a third cryptographic key set.

Communication channel 14 is used to send a first security code specific to the vehicle from electronic key 12 to electronic security system 10 for enabling operation of the vehicle function as in conventional systems such as described above.

According to this embodiment of the present invention, a second security code is used for configuring the mode of operation of electronic security system 10 between an unsecured and a secured mode of operation. When in unsecured mode, electronic security system 10 enables starting the engine on being provided with a first security code alone. When in secured mode, provision of a first security code alone does not enable starting of the engine.

Electronic security system 10 is also capable of communicating data with an electronic configuring device 16 over a communications channel 18. Electronic configuring device 16 is a portable device to be used by personnel involved in the storage and distribution of manufactured vehicles. Communication channel 18 is used to send a second security code from electronic configuring device if certain predetermined criteria are met as determined by electronic configuring device 16. To enable determination of whether or not the predetermined criteria are met, electronic configuring device 16 is also capable of receiving data from remote data resources maintained at remote data store 28. For example, the predetermined criteria may include a time period and a geographical region within which the configuration is permitted. The electronic configuring device may be provided with a Global Positioning System (GPS) transceiver to obtain from the GPS the current time and its location from a secure and reliable source.

Electronic configuring device 16 is capable of communicating data with a user terminal 20, such as a PC, over communication channel 22. User terminal 20 is capable of communicating with a central server 24 over communication channel 26. Central server 24 is capable of retrieving data from remote data store 28 over communication channel 30. User terminal 20, central server 24 and remote data store 28 together form a system for provisioning configuring device 16 with the predetermined criteria. Typically, there will be a plurality of user terminals such as user terminal 20 geographically located at each of the vehicle manufacturer's manufacturing and storage and distribution facilities. Similarly, there will typically be a plurality of electronic configuring devices 16 for use with any one user terminal, each of which may be provisioned with different predetermined criteria in dependence on the identity of the operator of the device. Furthermore, electronic configuring device 16 is capable of storing a plurality of predetermined criteria which may be specific to the electronic security systems of more than one vehicle. Thus, one electronic configuring device 16 may be used to configure the mode of operation of electronic security systems fitted to a plurality of vehicles.

Communications channels 14, 18, 22, 26 and 30 may use any electronic data communication medium or mode, whether fixed or wireless, packet or circuit switched. Preferably, communication channels 14 and 18 use a similar RF communications protocol, namely that used by a conventional electronic key 12, so as to minimize equipment requirements on the vehicle. However, other wireless proximity bearers may be used such as IrDA and Bluetooth™. Communication channel 26 preferably uses a client/server communication mode, for example HTTP, over a public fixed data network such as the Internet. A virtual private network arrangement may be used for communications over the Internet between central server 24 and user terminal 20. Preferably, secure data encryption is used in communications over each of communication channels 14, 18, 22, 26 and 30 to prevent third parties obtaining access to the cryptographic key data.

In preferred embodiments, the physical components of electronic security system 10 are conventional and will not be described further here. The software components, however, are not conventional and will be described below.

Figure 2:
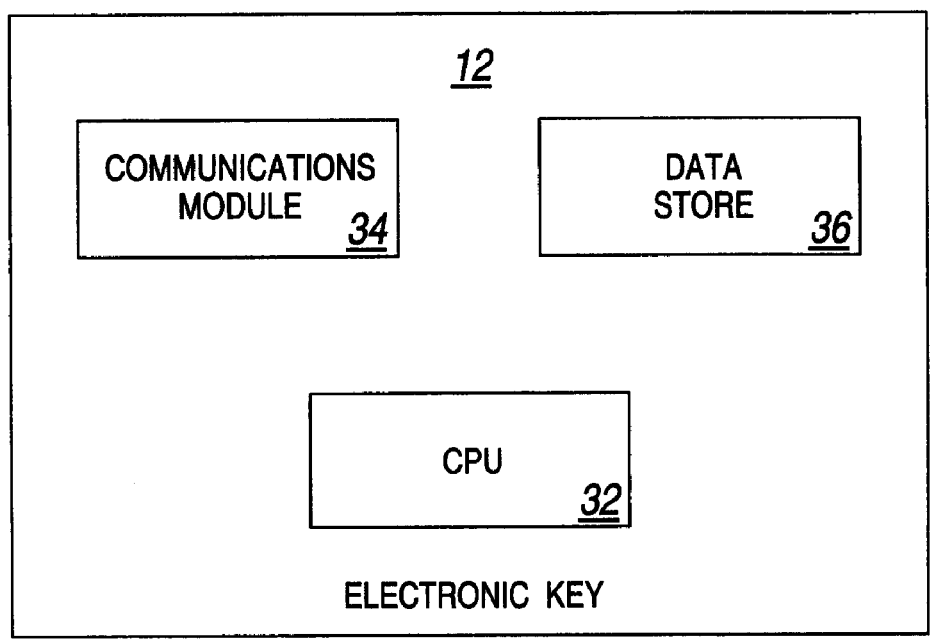
FIG. 2 is a schematic block diagram showing the main components of an electronic key for use in an embodiment of the present invention.

FIG. 2 is a block diagram showing the main components of electronic key 12. CPU 32 is connected to communications module 34, and a non-volatile data store 36. Communications module 34 is capable of communicating with the conventional transceiver in electronic security system 10 and of communicating a vehicle-specific first security code. The cryptographic key for the first security code is stored in data store 36 and accessed by CPU 32 for transmission in response to the user pressing a button on the key or on interrogation by the vehicle's RF transponder in response to the user turning the key in the engine start mechanism.

Figure 3:
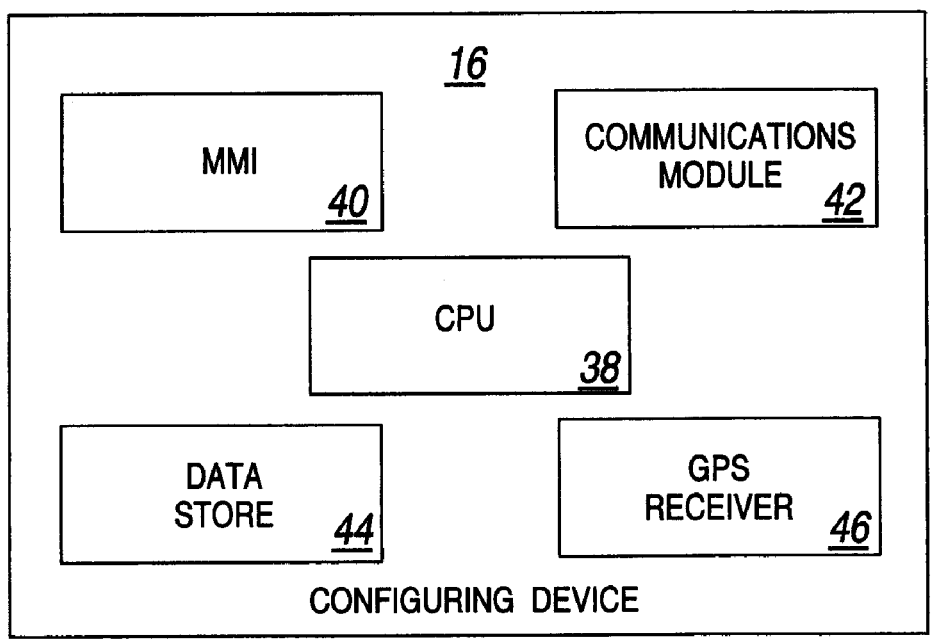
FIG. 3 is a schematic block diagram showing the main components of an electronic configuring device for use in an embodiment of the present invention.

FIG. 3 is a block diagram showing the main components of electronic configuring device 16. CPU 38 is connected to communications module 42, a non-volatile data store 44, a man machine interface (MMI) 40, and a GPS receiver 46. Users, such as personnel involved in the storage and distribution of manufactured vehicles, use the MMI 40 to control the operation of electronic configuring device 16. User interfaces are provided for user entry of a PIN number or other user identifier and for initiating the process of determining whether predetermined criteria are met and consequently communicating a vehicle-specific second security code to electronic security system 10 using communications module 42. User interfaces are also provided for user entry of a PIN number or other user identifier and for initiating the process of communicating a third security code, generated using a cryptographic key common to all of a large set of vehicles subject to the security system of this embodiment of the present invention, to electronic security system 10 using communications module 42. Communication module 42 is also capable of receiving cryptographic keys for the generation of second security codes and predetermined criteria from user terminal 20. Data representing predetermined criteria, cryptographic keys, the third security code and other data, algorithms and software for executing the processes performed by CPU 38, are stored in data store 44. Typically, a plurality of predetermined criteria and cryptographic keys for second security codes are simultaneously communicated to electronic configuring device 44 and stored in data store 44. Optionally, user interfaces may be provided for initiating reception of this data and for management of data.

FIG. 4 is a schematic diagram showing the data representing predetermined criteria and cryptographic keys for second security codes according to an embodiment of the present invention. Three vehicle-specific data records are shown in three individual rows. Each data record comprises a plurality of fields shown at columns 48, 50, 52, 54 and 56 representing a vehicle ID, time period, geographic region, user ID and second security code cryptographic key respectively. The first four of these are data specifying predetermined criteria which must be met before the second security code may be transmitted by electronic configuring device 16 to electronic key 12. The three illustrative data records show predetermined criteria for three different vehicles but with the same temporal and geographical conditions and specified for use by the same user. Thus, when provided to electronic configuring device 16, all three data records enable a user with user ID 2665474643 to configure electronic security system 10, via electronic key 12, provided the date is between 17.6.2001 and 18.6.2001 and provided the configuration is performed within a region defined as a circle of radius 35 miles centred on latitude 43.67, longitude 47.35. However, the first data record will only be able to configure a vehicle with vehicle ID 355454668 and so on. Also, the second security code cryptographic keys in the three data records are different for each vehicle ID and correspond to unique cryptographic keys for second security codes pre-stored in the electronic security system fitted to the corresponding vehicle thus ensuring that release of a secure mode setting is limited to an authorized person and satisfying predetermined criteria for the correct vehicle. In other embodiments of the present invention some of the predetermined criteria may be omitted and other predetermined criteria may also be included.

Figure 5:
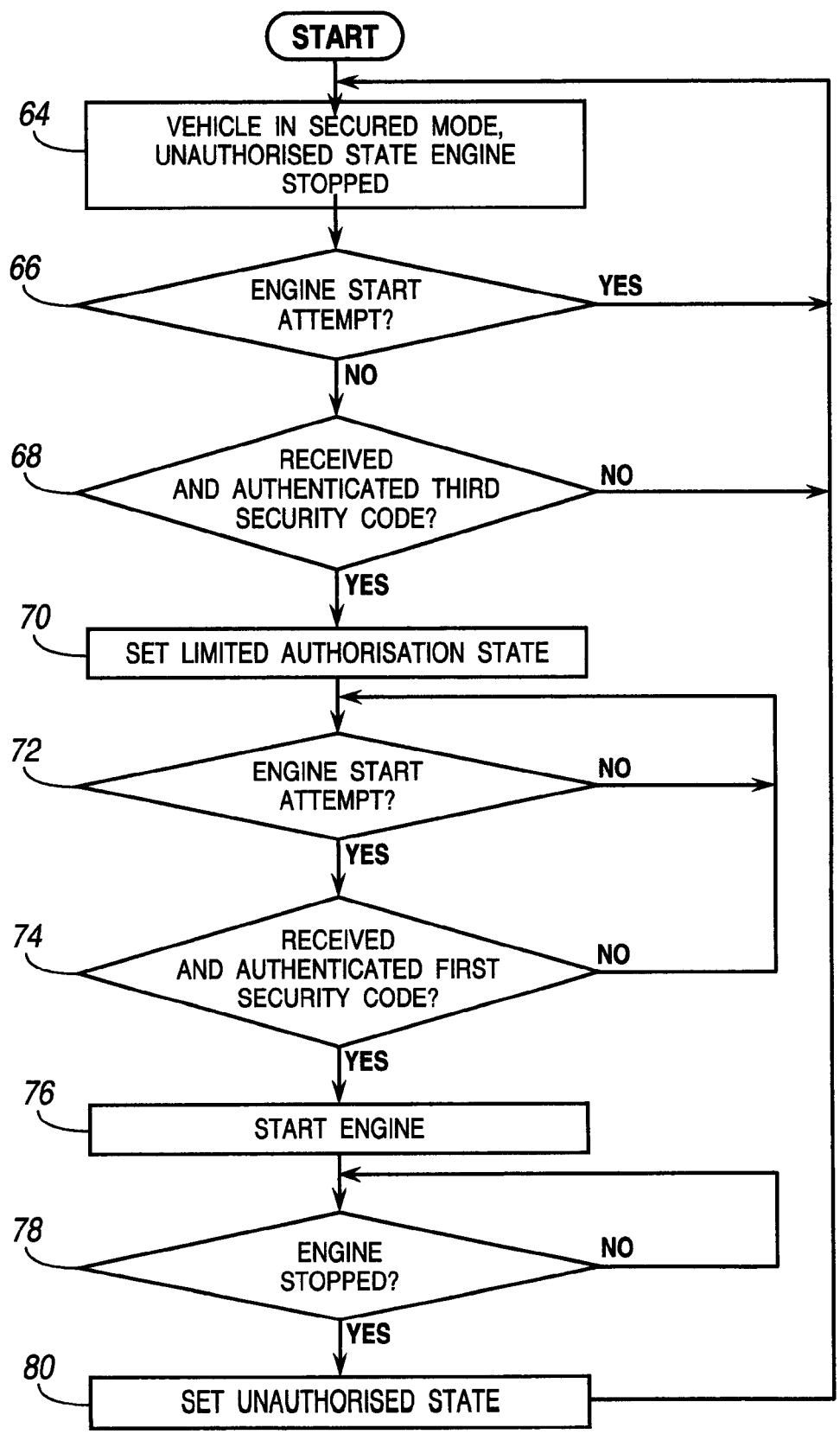
FIG. 5 is a flow diagram showing the procedure followed by an electronic security system when in a secured state according to an embodiment of the present invention.

FIG. 5 is a flow diagram showing the procedure followed by electronic security system 10 according to an embodiment of the present invention, when the security system is in the secured mode. The process starts at step 64 with electronic security system 10 in secured mode with the engine stopped, the key in the vehicle and the doors of the vehicle unlocked. This is the default mode of operation after vehicle manufacture. If at step 68 an attempt is made to start the vehicle engine when the engine is in secured mode, by turning the key in the ignition, the engine does not start although the user has conducted the usual engine start action using the correct key, containing a correct first security code, for the vehicle. The process returns to step 64 and the vehicle remains in secured mode with the engine stopped.

If a person is authorized to operate the vehicle whilst in secured mode, the person will have an electronic configuring device, and as described above will be able to use the device 16 to transmit the third security code to the vehicle. Typically, the device 16 will first interrogate the vehicle key to obtain the vehicle ID, and use the vehicle ID along with the common cryptographic key to generate the third security code. If in step 68 the security system 10 does not receive and authenticate a third security code, the process returns to step 64 and the vehicle remains in secured mode with the engine stopped. If in step 68 the security system 10 does receive and authenticate a third security code, the limited authorisation state is set for the vehicle, step 70, allowing the user to start the engine of the vehicle by turning the vehicle key 12 in the ignition. Although not shown in FIG. 5, the limited authorisation state may be enabled for a limited time period, which times out if no engine start attempt is detected, and the process returns to step 64.

When an engine start attempt is detected in the limited authorisation state, for example by detecting a turn of the ignition key, the process continues to step 72 where the electronic key 12 is interrogated for the conventional vehicle specific first security code. If the first security code is not received and authenticated, then the process returns to the limited authorisation state below step 70, and the vehicle remains in secured mode with the engine stopped. If at step 74 the first security code is received and authenticated, the engine immobilizer is disabled and the engine is started, allowing the vehicle to be driven, step 76. When the engine is next stopped, after a predetermined no of repetitions of the engine stop/start process, step 78, the security system automatically resets the security system to the unauthorized state, and the process returns to step 64. If a user then tries to start the engine using the electronic key 12 alone, the engine does not start.

In alternate embodiments of the present invention, electronic security system 10 stores a list of unique cryptographic keys for the generation of third security codes any of which may be provided to enable configuration and each of which contains data indicating a number of engine starts, time or period of time for which the configuration is valid. For example, a certain third security code may indicate that the configuration is valid for 3 engine starts. Electronic security system 10 maintains a counter recording the number of engine starts that occur during the limited authorisation configuration and after three engine starts, the system is automatically set back to the unauthorized state in secured mode. Optionally, after provision of a third security code and configuration of the unsecured mode of operation, the third security code is erased from or marked as non-operable in electronic security system 10 thus preventing repetition of the configuration using the same third security code.

Figure 6:
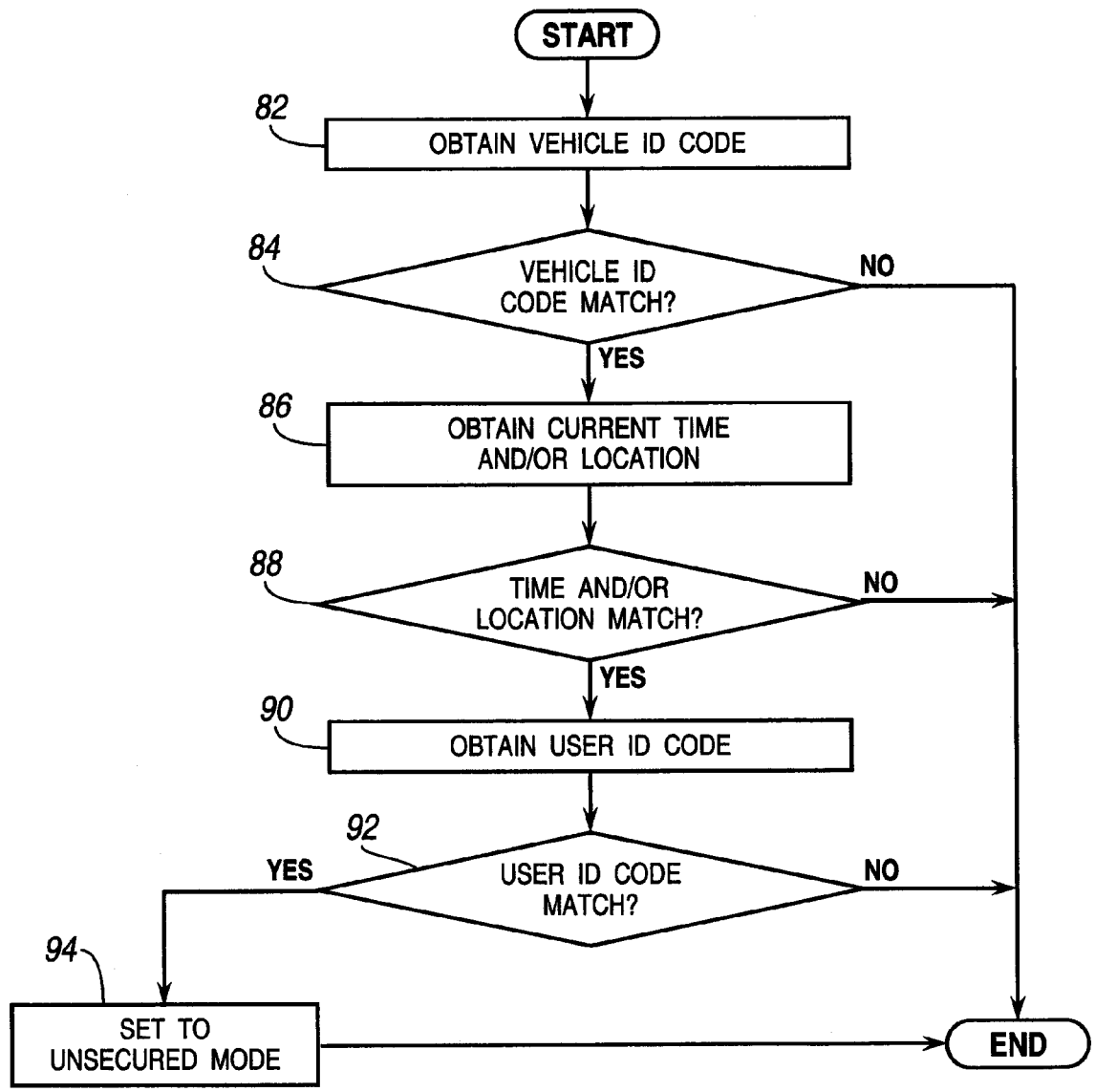
FIG. 6 is a flow diagram showing the procedure followed by an electronic configuring device to set an electronic security system to an unsecured state according to an embodiment of the present invention.

FIG. 6 is a flow diagram showing the procedure followed by electronic configuring device 16 when configuring the system to a permanent unsecured mode. In the unsecured mode, the security system no longer requires periodic re-authorisation using the electronic configuring device. The unsecured mode is typically set when the car is delivered to a dealer or end consumer. In unsecured mode, when an engine start attempt is made using the correct vehicle key 12, and the first security code is authenticated by the security system 10, the vehicle immobilizer is switched off and the engine is started, irrespective of how many times the engine has been started since the vehicle was configured in unsecured mode.

Referring to FIG. 6, When the user operates MMI 40 to initiate the process of determining whether the predetermined criteria are met and consequently communicating a second security code to electronic key 12, the process starts at step 82, electronic configuring device 16 interrogates electronic key 12 for the vehicle ID security code in a similar manner to electronic security system 10. At step 84 the vehicle ID code is checked against the data records stored in electronic configuring device 16. If no match is found, the process ends. If a match is found, the process continues to step 86 where a current time and/or geographical location are obtained using GPS receiver 46. At step 88, the current time and geographical location are checked against the corresponding criteria in all data records matching the vehicle ID. If no match is found, the process ends. If a match is found, the process continues to step 90 where electronic configuring device 16 queries the user for a user identifier such as a manually entered PIN or identifier stored on a smart card. At step 92, the user ID is checked against the user ID contained in any data records for which the vehicle ID and geographic time/location settings matched. If no final match is found, the process ends. If a final match is found, the process continues to step 94 where a corresponding second security code is generated and transmitted to electronic security system 10 using communication module 42 in order to set the system to unsecured mode. The security system authenticates the second security code using a corresponding stored cryptographic key and, on authentication, sets the vehicle permanently to unsecured mode. After successful transmission, the data record may be deleted. In unsecured mode, the electronic key 12 operates in the conventional fashion to unlock the vehicle doors and to start the engine in response to the appropriate user action.

In alternate embodiments of the present invention, electronic security system 10 stores a number of limited authorisation settings and/or a predetermined absolute time, a period of time since manufacture or a mileage driven since manufacture which are checked against the current time, a time counter maintained since manufacture or the current mileage recorded by the vehicle, respectively, after which the mode of operation of the vehicle is automatically and permanently configured to be the unsecured mode.

Various embodiments have been described above using an electronic configuration device to provide security codes which are used to configure an electronic security system. However, it should be understood that alternate embodiments are envisaged within the present invention. In one alternate embodiment, the electronic configuring device is used to configure the electronic key, which in turn configures the electronic security system to provide the functionality described. In another alternate embodiment, the electronic configuring device is co-located with the electronic key (preferably without duplication of components), thus the electronic key is itself capable of being provided with predetermined criteria for configuring the electronic security system. In another alternate embodiment, the electronic configuring device is co-located with the electronic security system (again preferably without duplication of components), thus the electronic security system is capable of being provided with predetermined criteria for self-configuration.

In further alternate embodiments, the mode of operation is not maintained by the electronic security system but by the electronic key which operates to transmit the vehicle specific security code in unsecured mode but not in secured mode. In yet further alternate embodiments, the electronic security system or electronic key may have more than two modes of operation, for example an unsecured mode and several levels of security in which various different vehicle functions may and may not be performed.

Further variations and modifications to the present invention are envisaged falling within the scope of the invention as defined in the appended claims.

The invention claimed is:

1. A system for securing a vehicle electronically, the system being capable of controlling the performance of a vehicle function in response to a user performing a user action, the system comprising:
   an electronic security device (10) fitted to the vehicle, the electronic security device being capable of controlling the performance of the vehicle function in response to being provided with a first security code;
   an electronic key (12), the key being capable of providing the first security code to the electronic security device in response to the user action; and
   an electronic configuring device (16) which is separate to the electronic security device and separate to the key, which electronic configuring device is capable of providing a second security code and a third security code,
   the system being arranged to provide a secured mode of operation and an unsecured mode of operation, the secured mode of operation and the unsecured mode of operation being provided based upon one or more predetermined criteria:
   wherein the secured mode of operation in which the electronic security device must be set to a limited authorisation state to enable performance of the vehicle function, following which the system automatically sets the electronic security device to an unauthorised state in which the user performing the action does not enable performance of the vehicle function; and wherein the unsecured mode of operation in which the user performing the action enables performance of the vehicle function without requiring the limited authorisation state to be set, wherein in said secured mode of operation the electronic security device is arranged to authenticate the second security code based upon the one or more predetermined criteria including a predetermined user ID, and in response to said authentication, altering its mode of operation from said secured mode to said unsecured mode, and wherein in said secured mode of operation the electronic security device is arranged to authenticate the third security code, and in response to said authentication, to alter its state from said unauthorised state to said limited authorisation state.

2. The system according to claim 1, wherein the first security code corresponds to a first cryptographic key set, the second security code corresponds to a second cryptographic key set, and the third security code corresponds to a third cryptographic key set.

3. The system according to claim 1, wherein the process of determining whether the predetermined criteria are met is performed by accessing remotely stored data other than data representing the predetermined criteria.

4. The system according to claim 3, wherein the remotely stored data includes one or more of the following:
a vehicle identifier;
temporal data;
geographical location data; and
a user identifier.

5. The system according to claim 2, wherein the predetermined criteria include:
the vehicle being a predetermined vehicle;
the time of user configuration being within a predetermined period of time; and
the geographic location being within a predetermined geographic area.

6. The system according to claim 1, wherein in the limited authorisation state the system monitors for one or more conditions being met, and on detecting said one or more conditions being met, automatically sets the electronic security device to the unauthorised state.

7. The system according to claim 6, wherein in said limited authorisation state the one or more conditions monitored include performance of the vehicle function, and wherein the unauthorised state is automatically set after n user actions have been performed resulting in the performance of the vehicle function, where n is an integer.

8. The system according to claim 1, wherein the unsecured mode of operation is permanently configured after the system has been set to the limited authorisation state a predetermined number of times and/or the vehicle has being driven a predetermined distance or after a predetermined time or period of time.

9. A method for securing a vehicle electronically by controlling the performance of a vehicle function in response to a user performing a user action, the method including the steps of:

providing an electronic security system including an electronic security device (10);

controlling the performance of the vehicle function in response to a first security code (74);

providing a secured mode of operation in which the electronic security device must be set to a limited authorisation state (70) to enable performance of the vehicle function, following which the electronic security device is automatically set to an unauthorised state (64) in which the user performing the action does not enable performance of the vehicle function; and providing an unsecured mode of operation in which the user performing the action enables performance of the vehicle function without requiring the limited authorisation state to be set, wherein in said secured mode of operation, arranging the system to authenticate a second security code based on at least one predetermined criteria including a user ID and a geographic area, and in response to said authentication, altering its mode of operation from said secured mode to said unsecured mode, and wherein in said secured mode of operation, arranging the system to authenticate a third security code, and in response to said authentication, to alter its state from said unauthorised state to said limited authorisation state.

10. An electronic security system for a vehicle having an engine and an engine immobilizer that disables the engine, the apparatus comprising:

an electronic security device having a secured mode and an unsecured mode and being configured to control at least one function of the vehicle, wherein the electronic security device is initially in the secured mode;

an electronic key being communicative with the electronic security device, the electronic key being adapted to transmit a first security code;

a configuring device being communicative with the electronic security device and the electronic key, the configuring device being adapted to interrogate the electronic key to obtain an ID of the vehicle and generate an additional security code;

wherein the electronic security device authenticates the additional security code and the vehicle enters a limited authorisation state allowing starting of the engine through the use of the electronic key for a limited time period; and wherein use of the electronic key causes authentication of the first security code and authentication of the first security code disables the engine immobilizer.

* * * * *